United States Patent
Coleman et al.

(10) Patent No.: US 6,822,794 B2
(45) Date of Patent: Nov. 23, 2004

(54) DIFFRACTIVE OPTICAL ELEMENT FOR PROVIDING FAVORABLE MULTI-MODE FIBER LAUNCH AND REFLECTION MANAGEMENT

(75) Inventors: Christopher L. Coleman, Santa Clara, CA (US); Ye Christine Chen, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 436 days.

(21) Appl. No.: 09/739,531

(22) Filed: Dec. 15, 2000

(65) Prior Publication Data

US 2004/0201893 A1 Oct. 14, 2004

(51) Int. Cl.[7] .................................................. G02B 6/42
(52) U.S. Cl. .......................... 359/565; 359/15; 359/19; 359/558; 385/31; 385/34; 385/89; 385/88
(58) Field of Search ............................ 359/558, 15, 34, 359/565, 16, 19; 385/31, 33, 34, 35, 88–93

(56) References Cited

U.S. PATENT DOCUMENTS 5,071,207 A 12/1991 Ceglio et al.
6,496,621 B1 * 12/2002 Kathman et al. ............. 385/31

FOREIGN PATENT DOCUMENTS

EP  1033597 A1  9/1999
GB  2252843 A   1/1992

OTHER PUBLICATIONS

Applied Optics, vol. 32, No. 22, Aug. 1, 1993, F S Roux, "Diffractive lens with a null in the centre of its focal point", pp. 4191–4192, Fig 1 especially.

* cited by examiner

Primary Examiner—Fayez Assaf

(57) ABSTRACT

A light transmission system includes a laser, an optical fiber, and a transfer lens. The transfer lens transfers light emitted by the laser into the optical fiber. The transfer lens includes a diffractive surface for receiving and collimating the light originating form the laser. The diffractive surface is defined by a surface function that includes a first phase function having angular symmetry and a second phase function having radial symmetry. The second phase function includes a cusp region with a discontinuous slope therein. The transfer lens provides reflection management so that light reflected from the end of the optical fiber is not focused at a location at which light is emitted by the laser and also favorable launch conditions so that light launched into the optical fiber avoids index anomalies along the axis of the optical fiber.

20 Claims, 5 Drawing Sheets

DIFFRACTIVE OPTICAL ELEMENT FOR PROVIDING FAVORABLE MULTI-MODE FIBER LAUNCH AND REFLECTION MANAGEMENT

FIELD OF THE INVENTION

The present invention relates generally to optics, and more particularly, to a diffractive optical element that provides favorable multi-mode fiber launch and reflection management.

BACKGROUND OF THE INVENTION

A vertical cavity surface emitting laser (VCSEL) emits light in a beam vertically from it surface. Light emitted from a VCSEL is typically focused by a transfer lens into an optical fiber and used for the transmission of data. Transmission technology such as Gigabit Ethernet technology utilizes VCSELs and multimode fiber optic cabling.

The ever-increasing data rate across multimode fiber optic systems requires more sophisticated coupling optics for the transmitter module to satisfy the required bit-error rate.

There are two important considerations in the design of a transfer lens: 1) reflection management, and 2) creation of a favorable launch condition. The first design consideration of reflection management seeks to minimize the amount of light that is reflected back from the surface of the optical fiber (referred to as "back reflections" or feedback) and directed to the light source (e.g., the laser). When reflections are not managed properly, the back reflections can cause stability problems for the laser source. Specifically, if these back reflections are not controlled or reduced, the laser can become de-stabilized and may operate with a noisy output signal. For example, when too much power is coupled back into the laser from the reflection from the end of the optical fiber, instabilities occur in the laser, and the output power oscillates up and down, thereby causing extra and damaging amounts of jitter as the received signal pulses. In other words, instability in the laser causes erroneous data signals.

Furthermore, the increased noise in the laser that is induced by the coupling lens can lead to a power penalty in the optical budget of the data link as high as 2.5 dB. It is evident that the increased power penalty due to the back reflections represents a significant fraction of the total link power budget which, for a 2.5 Gbit/sect data rate, is on the order of about 8 dB. This adverse effect of back reflections or feedback becomes more pronounced and significant for higher data rate systems. For example, the power budget for a 10 Gbit/sec link becomes even more taxed than the 2.5 Gbit/sec link.

Second, it is important that the transfer lens design provide a favorable launch condition at the fiber interface in order to maximize the bandwidth-distance product of the system. For example, for a standard 50 micron graded-index fiber, a 2.5 Gbit/sec link requires a bandwidth-distance product of 500 MHz*km. Similarly, for a 10 Gbit/sec link, the fiber needs to support a product of 2.2 Ghz*km.

A favorable launch condition should increase bandwidth of the system and is robust to lateral offsets (i.e., misalignment between the laser and the fiber). One approach to improve favorable launch condition is to avoid launching the light along the very center of the fiber. A reason for avoiding the center of the fiber is that many fibers have defects along the center of the fiber due to manufacturing limitations. Furthermore, tolerance for lateral offsets is desirable to compensate for any misalignment between the laser and the fiber. Otherwise, misalignment in the system (e.g., misalignment between the optical fiber and transfer lens or the misalignment between the transfer lens and the laser) may cause the light from the laser to miss the optical fiber.

Unfortunately, the prior art transfer lens designs have shortcomings in either addressing back reflections or providing favorable launch conditions. These shortcomings and disadvantages stem primarily from constraints and difficulties in lens fabrication.

Diffractive Vortex Lens for Mode-Matching Graded Index Fiber

There have been some attempts to use diffractive elements as coupling optics to launch light into graded index fiber. One such study is reported by E. G. Johnson, J. Stack, C. Koehler, and T. Suleski in the Diffractive Optics and Micro-Optics, Optical Society of America (OSA) Technical Digest, pp. 205–207, Washington, DC, 2000, in an article entitled, "Diffractive Vortex Lens for Mode-Matching Graded Index Fiber." This publication describes an approach that utilizes a diffractive element to match the phase of the launched light into specific modes of the graded index fiber.

While these prior art approaches provide tolerable results for ideal point light sources (i.e., light that has a simple distribution and is perfectly coherent), these approaches do not adequately address applications that employ light sources with more complex light distributions (e.g., a multimode laser). In these specific real-world applications, the prior transfer lens suffer from more destabilizing feedback due to poor management of back reflections, unfavorable launch conditions stemming from larger amounts of on-axis energy, or both.

Based on the foregoing, there remains a need for a transfer lens that simultaneously reduces back reflection and provides favorable launch conditions and that overcomes the disadvantages set forth previously.

SUMMARY OF THE INVENTION

According to one embodiment of the present invention, a transfer lens for transferring light emitted by a light source (e.g., a laser) into a light conducting medium (e.g., an optical fiber) is provided. The transfer lens includes a diffractive surface for receiving and collimating the light originating from the light source. The diffractive surface is defined by a surface function that includes a first phase function having angular symmetry and a second phase function having radial symmetry. The second phase function includes a cusp region with a discontinuous slope therein. The transfer lens provides reflection management so that light reflected from the end of the optical fiber is not focused at a location at which light is emitted by the light source. Furthermore, the transfer lens also provides favorable launch conditions so that light launched into the optical fiber avoids index anomalies on the axis of the optical fiber and at the core-cladding interface.

A further advantage of the transfer lens design of the present invention is that the diffractive surface of the transfer lens provides reflection management and favorable launch conditions, which is particularly advantageous for multi-mode fiber optic systems.

In accordance with one embodiment of the present invention, a light transmission system that includes a laser, an optical fiber, and a transfer lens is provided. The transfer lens transfers light emitted by the laser into the optical fiber. The transfer lens includes a diffractive surface for receiving and collimating the light originating form the laser. The diffractive surface is defined by surface function that includes a first phase function having angular symmetry and a second phase function having radial symmetry. The second phase function includes a cusp region with a discontinuous slope therein. The transfer lens provides reflection management so that light reflected from the end of the optical fiber is not focused at a location at which light is emitted by the laser and also favorable launch conditions so that light launched into the optical fiber avoids index anomalies along the axis of the optical fiber.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A diffractive optical element optimized for multi-mode fiber launch and feedback control is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Light transmission system 100

Figure 1:
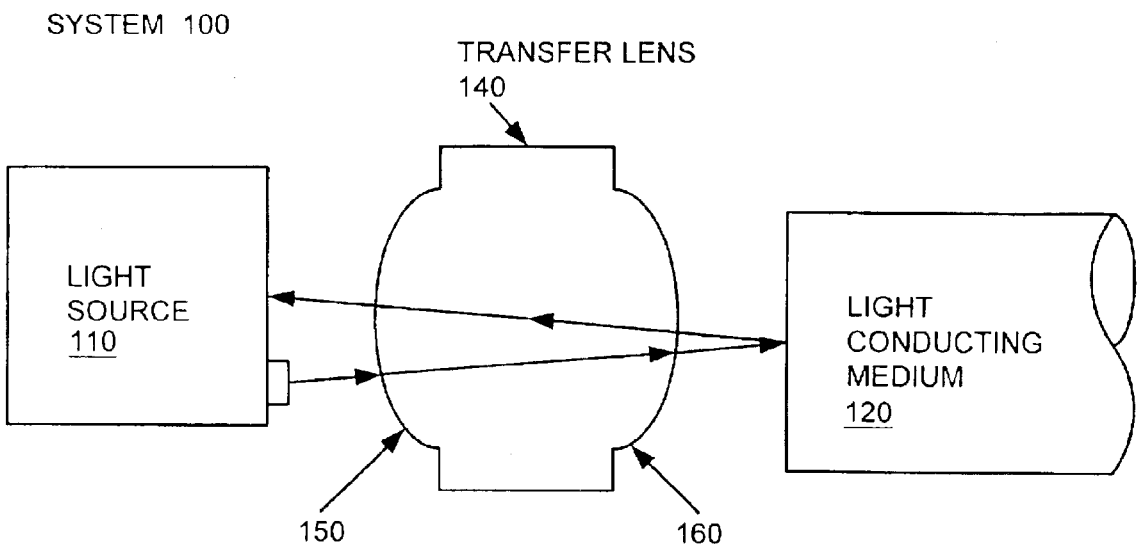
FIG. 1 is a simplified block diagram of an exemplary light transmission system in which the transfer lens can be utilized in accordance with a preferred embodiment of the present invention.

FIG. 1 is a simplified block diagram of an exemplary light transmission system 100 in which the transfer lens 140 can be utilized in accordance with a preferred embodiment of the present invention. The system 100 includes a light source 110 (e.g., a laser) for emitting light, a light conducting medium 120 (e.g., a fiber optic cable), and a transfer lens 140 of the present invention for transferring light emitted by the light source 110 to the light conducting medium 120.

The light source 110 can be a semiconductor laser, such as a vertical cavity surface emitting laser (VCSEL), whose construction and operation are known to those of ordinary skill in the art. The light conducting medium 120 can, for example, be a 50 micron multi-mode fiber or a 62.5 micron multi-mode fiber, which are well-known types of fiber optics cables. The transfer lens 140 of the present invention further provides favorable launch conditions and reflection management (also referred to herein as feedback management).

In the preferred embodiment, the transfer lens 140 includes a diffractive surface 150 for receiving and collimating the light originating form the light source and also for providing feedback management and favorable launch conditions. The transfer lens 140 includes an optical surface 160 (e.g., a refractive surface or a diffractive surface) for providing magnification of the light and focusing the light onto the light conducting medium 120. The transfer lens 140 of the present invention is described in greater detail hereinafter with reference to FIGS. 2–6.

One aspect of the transfer lens of the preferred embodiment is placing the diffractive surface 150 inside the packaging so that the diffractive surface 150 is less susceptible to dust and damage.

Diffractive surface 150

The diffractive surface 150 of the transfer lens shown in FIG. 1 is defined by a surface function. In accordance with a preferred embodiment of the present invention, the surface function for the diffractive surface 150 includes 1) a first phase function where the phase is dependent only on the polar angle coordinate of the aperture (herein referred to as a first phase function having "angular symmetry"), and 2) a second phase function where the phase is dependent only on the polar radial coordinate of the aperture (herein referred to as a phase function having "radial symmetry") and further having a cusp region. Preferably, the second phase function is symmetric with respect to an imaginary line drawn through the center of the aperture, and the cusp region has a discontinuous slope contained therein.

Figure 2A:
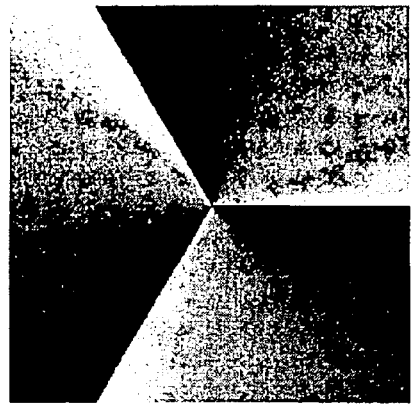
FIG. 2A illustrates an exemplary first phase function having angular symmetry.

Examples of a first phase function having angular symmetry and a second phase function having radial symmetry are now described. FIG. 2A illustrates an exemplary first phase function having angular symmetry (e.g., a spiral phase function where $m_S=+3$). $m_S$ is a real number (from $-INF$ to $+INF$) that describes how fast the phase changes as one traverses a circle about the center of the aperture.

Figure 2B:
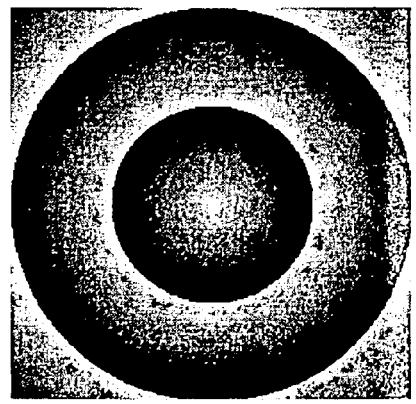
FIG. 2B illustrates an exemplary second phase function having radial symmetry.

FIG. 2B illustrates an exemplary second phase function having radial symmetry (e.g., a cone phase function where $m_C=-2$). $m_C$ is a real number (from $-INF$ to $+INF$) that describes how fast the phase changes as one traverses a radial line from the center of the aperture. The slope of the cone controls the change in phase values from 0 at the center of the aperture to $2*pi*m$ at the edge. Further examples of second phase function having radial symmetry and a cusp region are described with reference to FIG. 4.

Figure 2C:
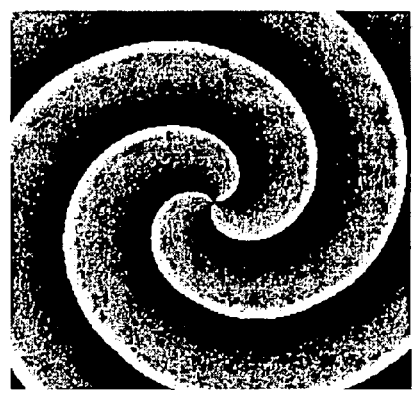
FIG. 2C illustrates a function that combines the first phase function of FIG. 2A and the second phase function of FIG. 2B in accordance with a preferred embodiment of the present invention.

FIG. 2C illustrates a function that combines the first phase function of FIG. 2A and the second phase function of FIG. 2B in accordance with a preferred embodiment of the present invention. In this embodiment, the particular "m" values are selected as follows: m=+3 for phase function having angular symmetry, and m=−2 for the phase function having radial symmetry. The "m" values can be determined by balancing the coupling efficiency, misalignment tolerances and the amount of feedback. It is noted that these "m" values may be adjusted to suit the requirements of a particular optical application.

It is noted that the surface function for the surface 150 can include other phase terms (e.g., a third phase function, a fourth phase function, etc.) to suit the requirements of a particular application. These additional phase functions or phase terms can include, for example, lens functions, aberration control functions, prism functions, and grating functions. These terms are known to those of ordinary skill in the art and will not be described further herein.

In an alternative embodiment, the surface 150 can be a collimating surface for receiving and collimating the light originating and the diffractive aspect of the present invention can be incorporated in surface 160. In this embodiment, surface 160 is a diffractive surface for providing feedback management and favorable launch conditions for the transfer lens.

Figure 3:
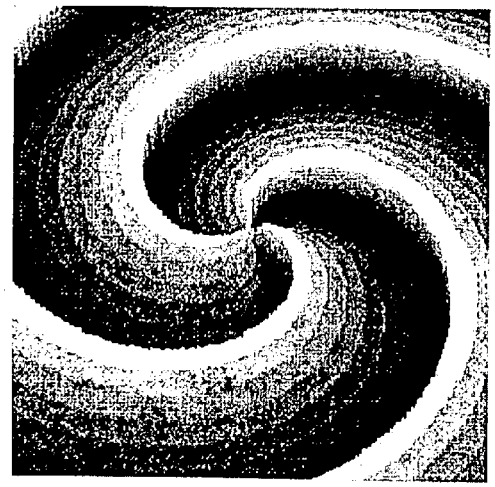
FIG. 3 illustrates a perspective view of a preferred diffractive surface of the transfer lens that has stair case features.

FIG. 3 illustrates a perspective view of a preferred diffractive surface of the transfer lens that has stair case features. It is noted that the stair-like or step-like feature of the diffractive surface is especially suited for manufacture by standard semiconductor processes. For example, well-known lithography involving masks and etch processing steps can be employed to realize the diffractive surface of transfer lens of the present invention. Alternatively, the diffractive surface can include continuous or smooth surface transitions. It is noted that the continuous or smooth surface transitions may lead to increased performance by the transfer lens of the present invention. However, this alternative embodiment may require more complex processing steps that include turning or milling the diffractive surface to achieve a continuous slope.

Figure 4:
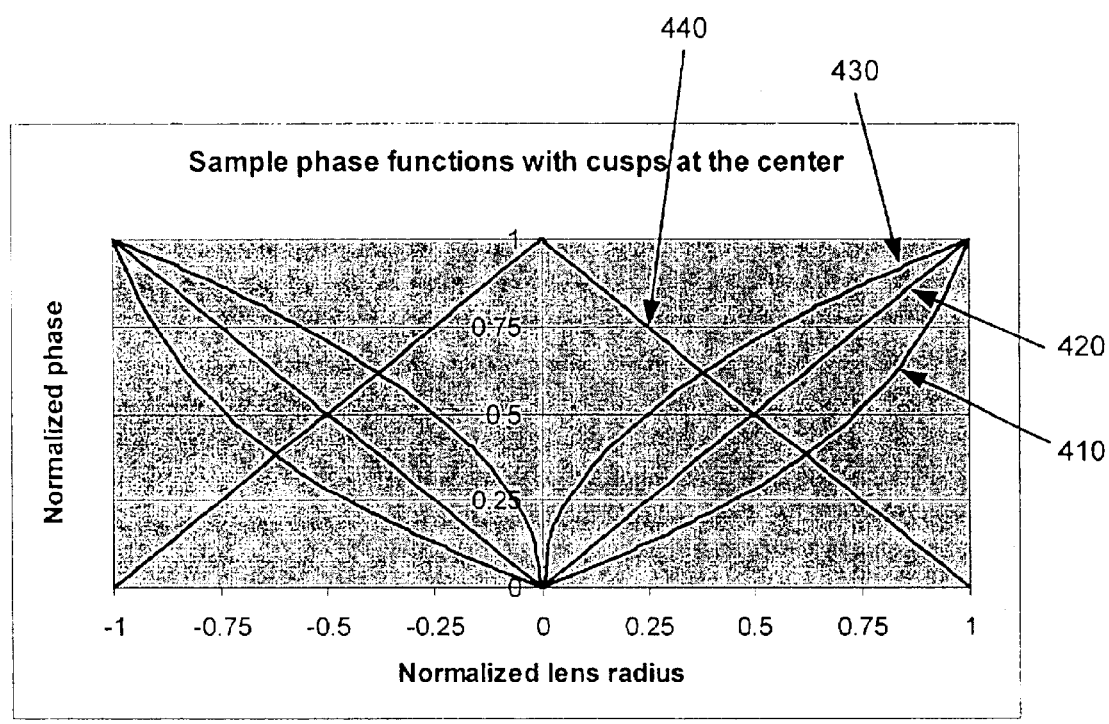
FIG. 4 illustrate cross-sections of exemplary phase functions having radial symmetry and a cusp region that can be incorporated into the diffractive surface of the transfer lens in accordance with embodiments of the present invention.

FIG. 4 illustrates sectional views of exemplary phase functions having radial symmetry and a cusp region that can be incorporated into the surface function of the diffractive surface of the transfer lens in accordance with embodiments of the present invention. A first phase function 410 has a cross section that features a generally concave profile. A second phase function 420 features a generally triangular cross-section. A first phase function 430 has a cross section that features a generally convex profile. It is noted that each of these phase functions can be inverted, and the inverted phase function can be utilized to achieve a similar result. For example, a fourth phase function 440 is an inverted version of the first phase function 410

Preferred Embodiment

Preferably, the design of the diffractive element of the present invention includes at least two phase functions (i.e., the first phase function having angular symmetry combined with the second phase function having radial symmetry) described above.

Describe the phase, $\phi$, of all points within the lens aperture with polar coordinates: $\rho$, $\theta$, where $\sigma$ is the distance of the point from the center of the aperture, and $\theta$ is the angle of the point from the x-axis.

In the preferred embodiment, the surface function of the diffractive element of the present invention includes at least a first phase function having angular symmetry (e.g., a spiral phase function) combined with a second phase function having radial symmetry (e.g., a cone phase function). For example, the surface function can be expressed as follows:

$$\phi = m_S^* \theta + 2\pi m_C^* \rho.$$

The spiral phase function can be expressed as follows:

$$\phi = m_S^* \theta$$

wherein '$m_S$' is a real number, –INF to +INF, that describes how fast the phase changes as one traverses a circle about the center of the aperture.

The cone phase function can be expressed as follows:

$$\phi = 2\pi m_C^* \rho$$

where '$m_C$' is a real number, –INF to +INF, that describes how fast the phase changes as one traverses a radial line from the center of the aperture. $\rho$ is a normalized radial coordinate so that $\rho$ is equal to 1 at the edge of the aperture, and $\rho$ is equal to zero at the center of the aperture.

As noted previously, other phase functions or phase terms may be added to the above surface function to further describe the optical properties of the diffractive element.

FIGS. 5–8 shows simulated light distributions at the fiber and feedback planes for the transfer lens of the present invention and the prior art transfer lens design for a multi-mode laser source (e.g., a multimode VCSEL source).

Figure 5:
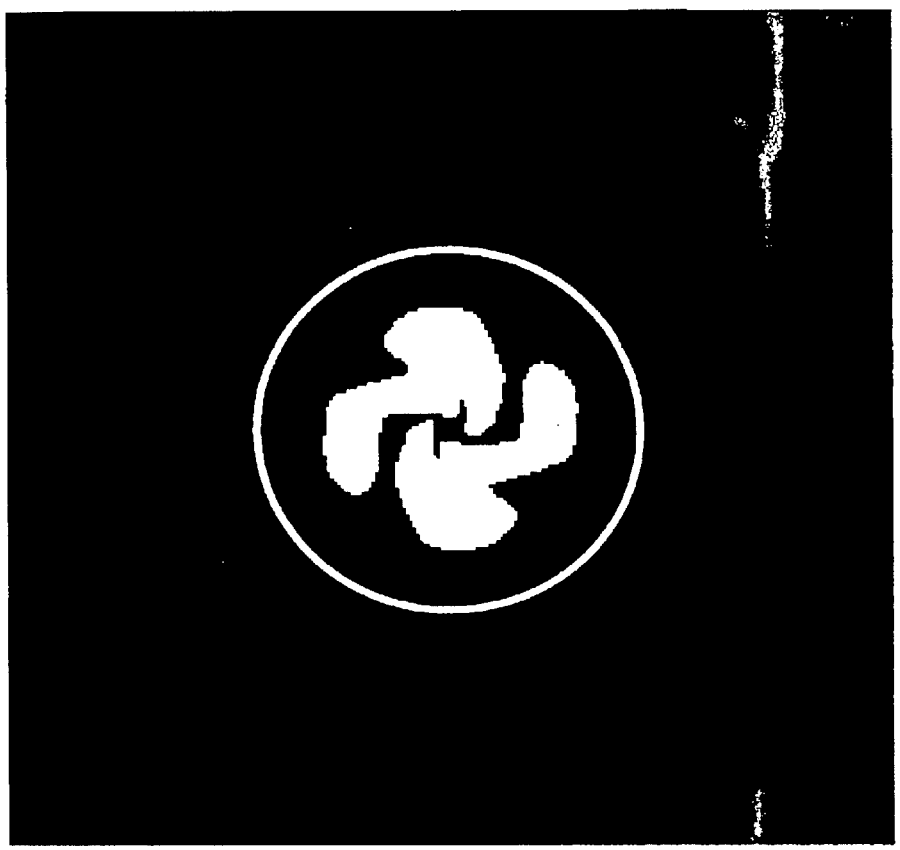
FIG. 5 is a spot diagram for the transfer lens of the present invention for illustrating favorable launch conditioning.
Figure 6:
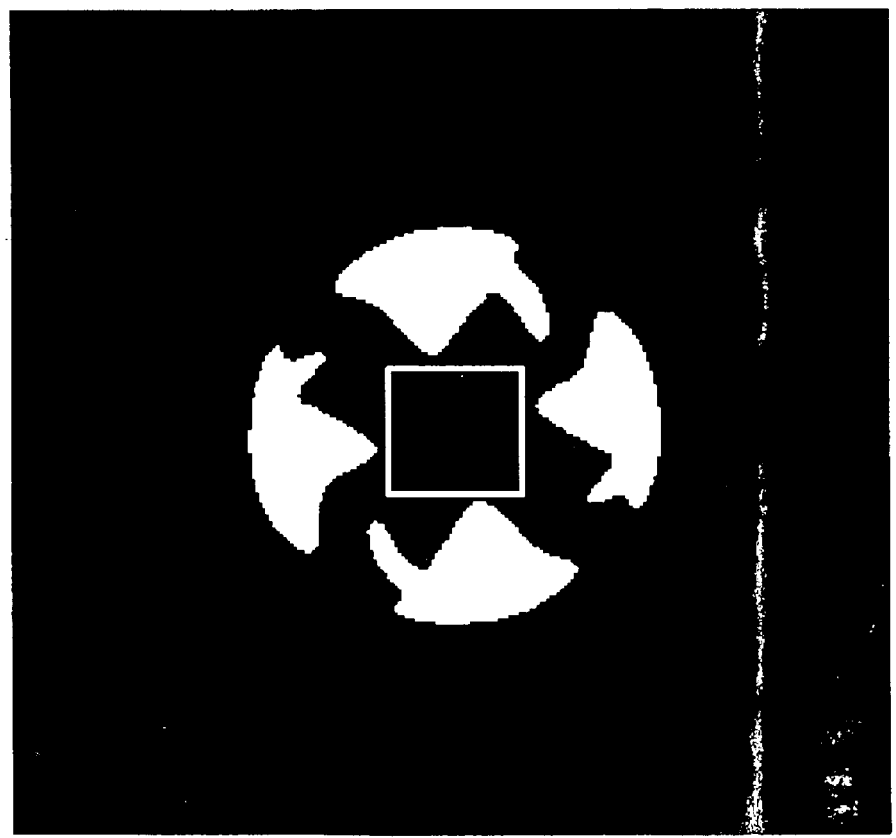
FIG. 6 is a spot diagram for the transfer lens of the present invention for illustrating reflection management.

FIG. 5 is a spot diagram for the transfer lens of the present invention for illustrating favorable launch conditioning. It is noted that the transfer lens of the present invention provides very efficient coupling and also avoids the center of the fiber. Specifically, the diffractive surface 150 provides favorable launch conditions so that light launched into the optical fiber avoids the index anomalies on the axis of the optical fiber and at the core-cladding interface. FIG. 6 is a spot diagram for the transfer lens of the present invention for illustrating reflection management. It is noted that the transfer lens of the present invention provides very good feedback management by directing reflections away from the light source.

Figure 7:
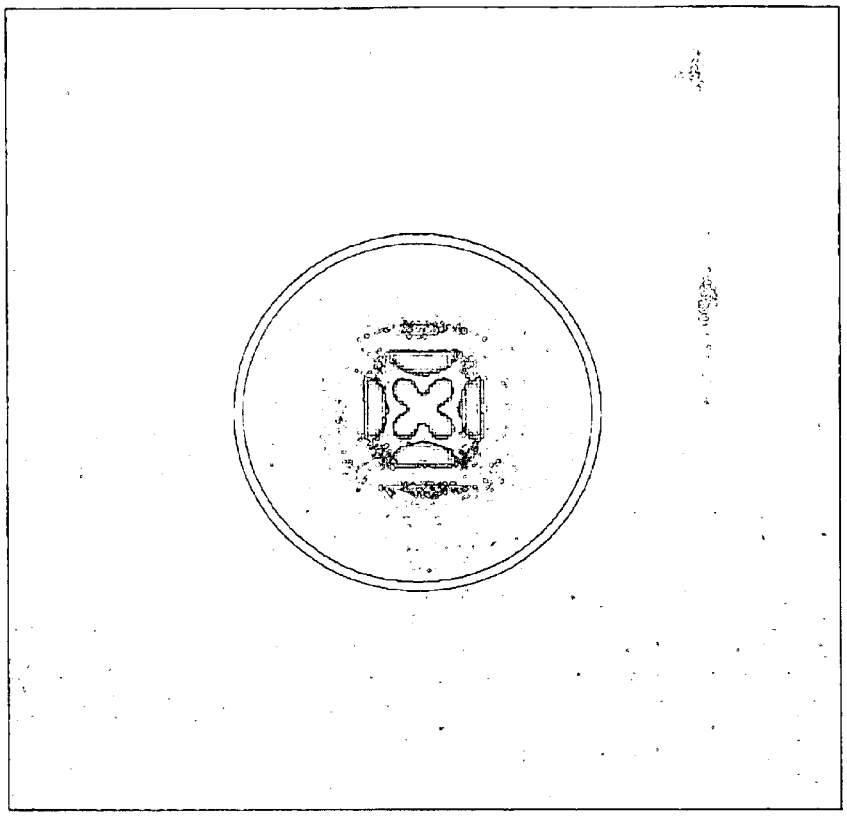
FIG. 7 is a spot diagram for a prior art transfer lens for illustrating poorer launch conditioning.

FIG. 7 is a spot diagram for a prior art transfer lens that exhibits increased energy launched along the axis of the fiber. In contrast to FIG. 5, the prior art transfer lens provides poorer launch conditioning since there is more energy launched into the center of the fiber optic cable. As described previously, it is disadvantageous to launch energy into the center since the manufacturing defects therein may adversely affect or decrease the bandwidth of the system.

Figure 8:
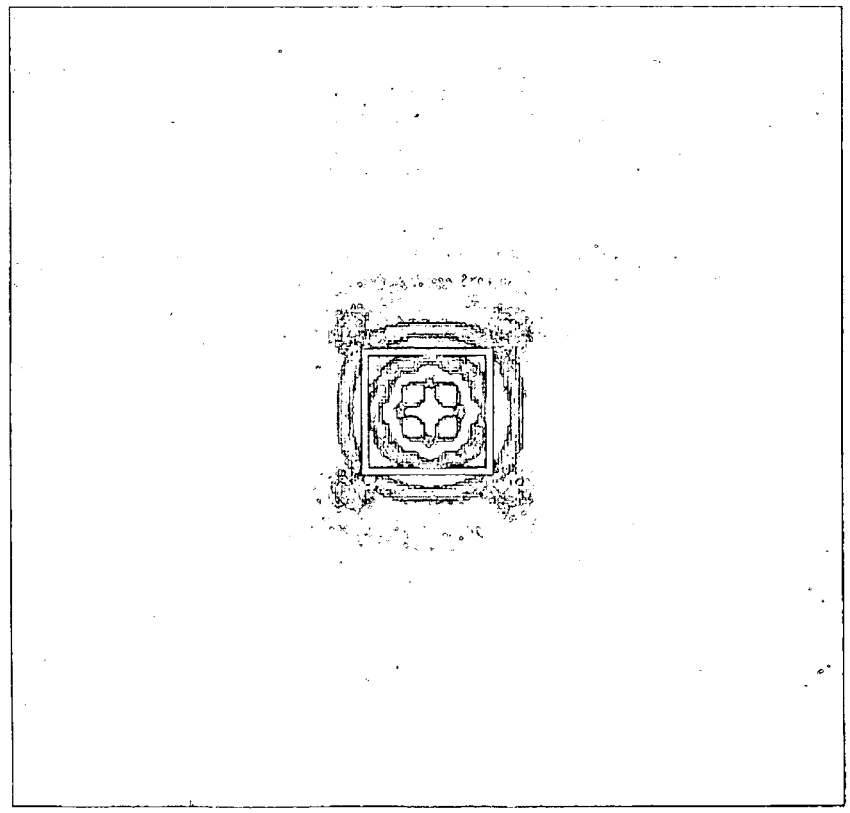
FIG. 8 is a spot diagram for a prior art transfer lens for illustrating poor reflection management.

FIG. 8 is a spot diagram for a prior art transfer lens for illustrating poor reflection management. In contrast to FIG. 6, the prior art transfer lens provides poor reflection management since there is more light reflected back into the light source. Consequently, the light source may suffer from stability problems due to poorly managed feedback.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

For example, the diffractive element of the present invention has been described in the context of launching light from a multi-mode laser into a fiber optic medium. However, it is to be appreciated that the diffractive element of the present invention can be applied to many different applications in a wide number of different areas. The diffractive element of the present invention is beneficial to any application where light needs to be coupled from a light source with a complex light distribution to another light conducting medium. For example, the diffractive element of the present invention can be utilized to transfer light between two multi-mode fibers.

What is claimed is:

1. An optical element for coupling a light source to a light conducting medium comprising:
   a diffractive surface that is defined by a surface function that includes
      a first phase function having angular symmetry and a first m value, and
      a second phase function having radial symmetry, a cusp region and a second m value; wherein the cusp region has a discontinuous slope therein; wherein the first m value and the second m value are selectively adjustable to control launch conditions and manage reflections.

2. The optical element of claim 1 wherein the first phase function is a spiral phase function; and wherein the second phase function is a cone phase function.

3. The optical element of claim 2 wherein the spiral phase function can be expressed as follows:

$$\phi = m_S * \theta$$

where '$m_S$' is a real number that describes how fast the phase changes as one traverses a circle about the center of the aperture; wherein '$\theta$' is an angular coordinate; and the cone phase function can be expressed as follows:

$$\phi = 2\pi m_C * \rho$$

where '$m_C$' is a real number that describes how fast the phase changes as one traverses a radial line from the center of the aperture;

wherein '$\rho$' is a normalized radial coordinate: wherein $\rho$ is equal to 1 at the edge of the aperture, and $\rho$ is equal to zero at the center of the aperture.

4. The optical element of claim 3 wherein $m_S$ is equal to =3 and $m_C$ is equal to −2.

5. The optical element of claim 3 wherein the values of $m_S$ and $m_C$ are selectively adjustable to control factors that include one of coupling efficiency, misalignment tolerances, and the amount of feedback.

6. The optical element of claim 3 wherein the values of $m_S$ and $m_C$ are selectively adjustable to suit the requirements of a particular optical application.

7. The optical element of claim 2 wherein the cone phase function includes a cross section that is one of a generally concave profile, a generally triangular cross-section, a generally convex profile, an inverted generally concave profile, an inverted generally triangular cross-section, and an inverted generally convex profile.

8. The optical element of claim 1 wherein the optical element provides reflection management so that light reflected from the end of the optical fiber is not directed to a location at which light is emitted by the laser; and wherein the optical element provides favorable launch conditions so that light launched into the optical fiber avoids index anomalies along the axis of the optical fiber.

9. The optical element of claim 1 further comprising:
an optical surface for focusing the light onto the optical fiber; and
wherein the diffractive surface receives and collimates the light originating from a light source.

10. The optical element of claim 1 further comprising:
packaging for housing the light source;
wherein the diffractive surface is disposed in the housing.

11. The optical element of claim 1 further comprising:
a third phase function that includes one of a lens phase function, an aberration control phase function, a prism phase function, and a grating phase function.

12. A method for manufacturing a diffractive surface for use in an optical element comprising:
defining a first phase function having angular symmetry and a first m value;
defining a second phase function having radial symmetry, a cusp region and a second m value; wherein the cusp region has a discontinuous slope therein;
defining a surface function that includes the first phase function and the second function by selecting values for the first m value and the second m value to control launch conditions and manage reflections; and
employing semiconductor processing techniques to manufacture a diffractive surface for use in the optical element in accordance with the surface function.

13. The method of claim 12 further comprising:
adding a third phase function to the surface function;
wherein the third phase function includes one of a lens phase function, an aberration control phase function, a prism phase function, and a grating phase function.

14. The method of claim 12 wherein the optical element couples light from a light source to a light conducting medium; and wherein defining a surface function that includes the first phase function and the second function includes selectively adjusting the first m value and the second m value to increase one of coupling efficiency between the light source and the light conducting medium and misalignment tolerances between the light source and the light conducting medium.

15. An optical element for coupling a light source to a light conducting medium comprising:
a diffractive surface that is defined by a surface function that includes
a first phase function having angular symmetry, and
a second phase function having radial symmetry and a cusp region; wherein the cusp region has a discontinuous slope therein; and
an optical surface for focusing the light onto the light conducting medium; wherein the diffractive surface receives and collimates the light originating from the light source.

16. The optical element of claim 15 wherein the first phase function is a spiral phase function; and wherein the second phase function is a cone phase function.

17. The optical element of claim 16 wherein the spiral phase function can be expressed as follows:

$$\phi = m_S * \theta$$

where '$m_S$' is a real number that describes how fast the phase changes as one traverses a circle about the center of the aperture; wherein '$\theta$' is an angular coordinate; and the cone phase function can be expressed as follows:

$$\phi = 2\pi m_C * \rho$$

where '$m_C$' is a real number the describes how fast the phase changes as one traverses a radial line from the center of the aperture;

wherein '$\rho$' is a normalized radial coordinate; wherein $\rho$ is equal to 1 at the edge of the aperture, and $\rho$ is equal to zero at the center of the aperture.

18. The optical element of claim 17 wherein $m_S$ is equal to =3 and $m_C$ is equal to −2.

19. The optical element of claim 15 wherein the optical element provides reflection management so that light reflected from the end of the light conducting medium is not directed to a location at which light is emitted by the light source.

20. The optical element of claim 15 wherein the optical element provides favorable launch conditions so that light launched into the light conducting medium avoids index anomalies along the axis of the light conducting medium.

* * * * *